United States Patent [19]

Meyer et al.

[11] 3,907,807
[45] Sept. 23, 1975

[54] BENZOQUINOLIZINE DERIVATIVES AND PROCESS FOR THEIR PREPARATION AND USE

[75] Inventors: Horst Meyer; Friedrich Bossert, both of Wuppertal-Elberfeld; Wülf Vater, Opladen; Kurt Stoepel, Wuppertal-Vohwinkel, all of Germany

[73] Assignee: Bayer Aktiengesellschaft, Germany

[22] Filed: Feb. 28, 1973

[21] Appl. No.: 336,476

[30] Foreign Application Priority Data
Sept. 12, 1972 Germany.......................... 2210623

[52] U.S. Cl....... 260/287 R; 260/251 R; 260/283 S; 260/286 R; 260/289 C; 260/295 R; 260/295.5 R; 260/471 R; 424/258
[51] Int. Cl.²....................................... C07D 215/20
[58] Field of Search........................ 260/287 R, 289

[56] References Cited
UNITED STATES PATENTS
2,245,261  6/1941  Dickey et al..................... 260/287 R

| | | | |
|---|---|---|---|
| 3,341,528 | 9/1967 | Shavel | 260/289 R |
| 3,673,189 | 6/1972 | Curran | 260/289 R |
| 3,709,887 | 1/1973 | Cooke | 260/287 R |

*Primary Examiner*—Donald G. Daus
*Assistant Examiner*—David E. Wheeler

[57] ABSTRACT

6,7,7a,8,9,10-Hexahydro-1H,5H-benzo[i,j]quinolizines bearing a lower alkyl, phenyl, substituted phenyl or a heterocyclic group in the 1-position and a carbonyl function in the 2-position, and being optionally substituted by lower alkyl in the 3-position and by carbalkoxy in the 7a-position, are antihypertensive agents and coronary vessel dilators. The compounds of which 1-(3-nitrophenyl)-3-methyl-10-oxo-6,7,7a,8,9,10-hexahydro-1H,5H-benzo[i,j]quinolizine-2-carboxylic acid ethyl ester is a representative embodiment, are prepared through condensation of an ylideneacetoacetic acid ester and a 7-oxo-1,2,3,4,4a,5,6,7-octahydroquinoline.

19 Claims, No Drawings

BENZOQUINOLIZINE DERIVATIVES AND PROCESS FOR THEIR PREPARATION AND USE

DETAILED DESCRIPTION

The present invention pertains to hexahydro-1H,5H-benzo[i,j]quinolizine derivatives, to processes for their production and use and to pharmaceutical compositions containing such compounds and useful as antihypertensive agents and coronary vessel dilators.

In particular, the present invention pertains to compound of the formula:

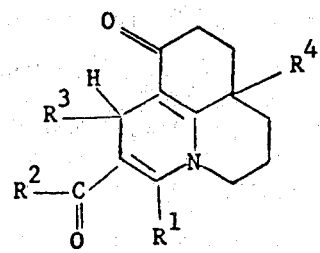

wherein
  $R^1$ is hydrogen or lower alkyl;
  $R^2$ is lower alkyl, lower alkoxy, lower alkoxy(lower alkoxy), lower alkenyloxy or lower alkynyloxy;
  $R^3$ is lower alkyl, lower alkenyl, lower alkynyl; phenyl; substituted phenyl in which the substituents are one to three members selected from the group consisting of lower alkyl, lower alkoxy, halogeno, nitro, cyano, trifluoromethyl, azido, carbo(lower alkoxy), lower alkylsulfonyl, lower alkylsulfinyl, or lower alkylthio; naphthyl; or a heterocyclic ring selected from the group consisting of quinolyl, isoquinolyl, pyridyl, pyrimidyl, thenyl, furyl and pyrryl, said heterocyclic ring being unsubstituted or substituted by one or two members selected from the group consisting of lower alkyl, lower alkoxy and halogeno; and
  $R^4$ is hydrogen or carbo(lower alkoxy).

The term lower alkyl denotes a univalent saturated branched or straight hydrocarbon chain containing from 1 to 6 carbon atoms. Representative of such lower alkyl groups are thus methyl, ethyl, propyl, isopropyl, butyl, isobutyl, sec.butyl, tert.butyl, pentyl, isopentyl, neopentyl, tert.pentyl, hexyl, and the like.

The term lower alkenyl denotes a univalent branched or straight hydrocarbon chain containing from 2 to 6 carbon atoms and nonterminal ethylenic unsaturation as, for example, vinyl, allyl, isopropenyl, 2-butenyl, 3-methyl-2-butenyl, 2-pentenyl, 3-pentenyl, 2hexenyl, 4-hexenyl, and the like.

The term lower alkynyl denotes a univalent branched or straight hydrocarbon chain containing from 2 to 6 carbon atoms and nonterminal acetylenic unsaturation as, for example, ethynyl, 2-propynyl, 4-pentynyl, and the like.

The term lower alkoxy denotes a straight or branched hydrocarbon chain bound to the remainder of the molecule through an ethereal oxygen atom as, for example, methoxy, ethoxy, propoxy, isopropoxy, butoxy, isobutoxy, pentoxy and hexoxy.

The term lower alkylthio denotes a branched or straight hydrocarbon chain bound to the remainder of the molecule through a divalent sulfur as, for example, methylthio, ethylthio, propylthio, isopropylthio, butylthio, and the like.

The term halogen denotes the substituents fluoro, chloro, bromo and iodo.

As indicated, the present invention also pertains to the physiologically acceptable non-toxic acid addition salts of these basic compounds. Such salts include those derived from organic and inorganic acids such as, without limitation, hydrochloric acid, hydrobromic acid, phosphoric acid, sulfuric acid, methane sulphonic acid, acetic acid, tartaric acid, lactic acid, succinic acid, citric acid, malic acid, maleic acid, sorbic acid, aconitic acid, salicylic acid, phthalic acid, embonic acid, enanthic acid, and the like.

According to the present invention, the foregoing compounds are prepared by reacting a dicarbonyl compound of the formula:

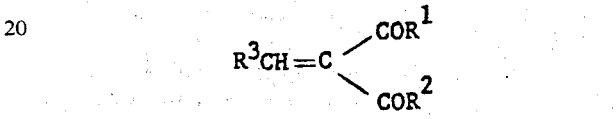

wherein $R^1$, $R^2$ and $R^3$ are as herein defined, with 7-oxo-1,2,3,4,4a,6,7-octahydroquinoline of the formula:

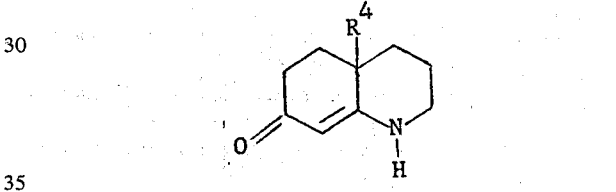

in which $R^4$ is as herein defined. The condensation proceeds smoothly in good yields simply by heating the two components, generally in the presence of an inert organic solvent such as methanol, ethanol, propanol and similar alkanols, ethers such as dioxane and diethyl ether, glacial acetic acid, pyridine, dimethylformamide, dimethylsulfoxide, acetonitrile and the like. The reaction is conducted at temperatures of from 20° to 200°C, conveniently at the boiling point of the solvent, and while elevated pressure may be utilized, normal atmospheric pressure is generally satisfactory. The reactants are employed in substantially equimolar amounts. The dicarbonyl reagent can be utilized as such or generated in situ by the reaction of an aldehyde of the formula $R^3CHO$ and a β-dicarbonyl compound of the formula $R^1COCH_2COR^2$.

It is rather surprising that the above described condensation produces the desired compounds in such good yields and with such high purity since the only even distantly related condensation is that of a benzylideneacetoacetic acid ester with an amino crotonic acid ester to yield a 1,4-dihydropyridine (Knoevenagel, Ber. 31, 743, 1898).

Many of the dicarbonyl compounds utilized as one of the reactants are known to the art and the others can either be generated in situ as herein described or prepared according to methods well known to the art, see for example Org. Reaction XV, 204 et seq. (1967). Typical of this reactant are the following compounds:

benzylideneacetoacetic acid methyl ester, ethylideneacetoactetic acid methyl ester,
isopropylideneacetoacetic acid methyl ester,
2-nitrobenzylideneacetoacetic acid methyl ester,
2-nitrobenzylideneacetylacetone,
benzylideneacetylacetone,
3-nitrobenzylideneacetoacetic acid methyl ester,
3-nitrobenzylideneacetoacetic acid propargyl ester,
3-nitrobenzylideneacetoacetic acid allyl ester,
3-nitrobenzylideneacetoacetic acid β-methoxyethyl ester,
3-nitrobenzylideneacetoacetic acid β-ethoxyethyl ester,
3-nitrobenzylideneacetoacetic acid isopropyl ester,
3-nitrobenzylideneacetylacetone,
4-nitrobenzylideneacetylacetone,
4-nitrobenzylideneacetoacetic acid β-propoxyethyl ester,
4-nitrobenzylideneacetoacetic acid n-propyl ester,
3-nitro-6-chlorobenzylideneacetoacetic acid methyl ester,
2-cyanobenzylideneacetoacetic acid methyl ester,
2-cyanobenzylideneacetoacetic acid methyl ester,
2-cyanobenzylideneacetoacetic acid ethyl ester,
2-cyanobenzylidenepropionylacetic acid ethyl ester,
3-cyanobenzylideneacetoacetic acid methyl ester,
3-nitro-4-chlorobenzylideneacetylacetone,
3-nitro-4-chlorobenzylideneacetoacetic acid t-butyl ester,
3-nitro-4-chlorobenzylideneacetoacetic acid methyl ester,
2-nitro-4-methoxybenzylideneacetoacetic acid methyl ester,
2-cyano-4-methylbenzylideneacetoacetic acid ethyl ester,
2-azidobenzylideneacetoacetic acid ethyl ester,
3-azidobenzylideneacetylacetone,
2-methylmercaptobenzylideneacetoacetic acid isopropyl ester,
2-sulphinylmethylbenzylideneacetoacetic acid ethyl ester,
2-sulphonylbenzylidenemethylacetoacetic acid allyl ester,
4-sulphonylmethylbenzylideneacetoacetic acid ethyl ester,
naphth-1-ylideneacetoacetic acid methyl ester,
naphth-1-ylideneacetoacetic acid ethyl ester,
naphth-2-ylideneacetoacetic acid ethyl ester,
2-ethoxynaphth-1-ylideneacetoacetic acid methyl ester,
2-methoxynaphth-1-ylideneacetoacetic acid ethyl ester,
5-bromonaphth-1-ylideneacetoacetic acid methyl ester,
quinol-2-ylmethylideneacetoacetic acid methyl ester,
quinol-3-ylmethylideneacetoacetic acid methyl ester,
quinol-4-ylmethylideneacetoacetic acid ethyl ester,
quinol-8-ylmethylideneacetoacetic acid ethyl ester,
isoquinol-1-ylmethylideneacetoacetic acid methyl ester,
isoquinol-3-ylmethylideneacetoacetic acid methyl ester,
α-pyridylmethylideneacetoacetic acid methyl ester,
α-pyridylmethylideneacetoacetic acid ethyl ester,
α-pyridylmethylideneacetoacetic acid allyl ester,
α-pyridylmethylideneacetoacetic acid cyclohexyl ester,
β-pyridylmethylideneacetoacetic acid β-methoxyethl ester,
γ-pyridylmethylideneacetoacetic acid methyl ester,
6-methyl-α-pyridylmethylideneacetoacetic acid ethyl ester,
4,6-dimethoxypyrimid-5-ylmethylideneacetoacetic acid ethyl ester,
then-2-ylmethylideneacetoacetic acid ethyl ester,
fur-2-ylmethylideneacetoacetic acid allyl ester,
pyrr-2-ylthylideneacetoacetic acid methyl ester,
nitrobenzylidenepropionylacetic acid ethyl ester,
α-pyridylmethylidenepropionylacetic acid ethyl ester,
α-pyridylmethylidenepropionylacetic acid methyl ester,
α-pyridylmethylideneacetylacetone,
2-, 3- or 4-methoxybenzylideneacetoacetic acid ethyl ester,
2-, 3- or 4-methoxybenzylideneacetylacetone,
2-methoxybenzylideneacetoacetic acid allyl ester,
2-methoxybenzylideneacetoacetic acid allyl ester,
2-methoxybenzylideneacetoacetic acid propargyl ester,
2-methoxybenzylideneacetoacetic acid β-methoxyethyl ester,
2-isopropoxybenzylideneacetoacetic acid ethyl ester,
3-butoxybenzylideneacetoacetic acid methyl ester,
3,4,5-trimethoxybenzylideneacetoacetic acid allyl ester,
2-methylbenzylidenepropionylacetic acid methyl ester,
2-, 3- or 4-methylbenzylideneacetoacetic acid ethyl ester,
2-methylbenzylideneacetoacetic acid β-methoxyethyl ester,
2-methylbenzylideneacetoacetic acid β-propoxyethyl ester,
2-methylbenzylideneacetylacetone,
3,4-dimethoxy-5-bromobenzylideneacetoacetic acid ethyl ester,
2-, 3- or 4-chlorobenzylideneacetoacetic acid ethyl ester,
2-, 3- or 4-bromobenzylideneacetoacetic acid ethyl ester,
2-, 3- or 4-fluorobenzylideneacetoacetic acid ethyl ester,
2-fluorobenzylideneacetoacetic acid methyl ester,
3-chlorobenzylideneacetylacetone,
3-chlorobenzylidenepropionylacetic acid ethyl ester,
3-chlorobenzylideneacetoacetic acid ethyl ester,
2-chlorobenzylideneacetoacetic acid allyl ester,
2-, 3- or 4-trifluoromethylbenzylideneacetoacetic acid isopropyl ester,
3-trifluoromethylbenzylideneacetoacetic acid methyl ester,
2-carbethoxybenzylideneacetoacetic acid ethyl ester,
3-carbomethoxybenzylideneacetoacetic acid methyl ester,
4-carboisopropoxybenzylideneacetoacetic acid isopropyl ester,
4-carbomethoxybenzylideneacetoacetic acid allyl ester,
3-nitrobenzylidenecyclohexane-1,3-dione, and
3-nitrobenzylidenecycloheptane-1,3-dione.

The quinoline reactants are similarly known or can be readily produced according to known methods, see for example Grob et al., Helv. Chim. Acta 48, 808 (1965). Typical of these reactants are $\Delta^{8,9}$-octahydro-7-quinoline (alternatively named as 7-oxo-1,2,3,4,4a,5,6,7-octahydroquinoline), $\Delta^{8,9}$-octahydro-7-quinoline-4a-carboxylic acid methyl ester (alternatively named as 4a-carbomethoxy-7-oxo- 1,2,3,4,4a,5,6,7-octahydroquinoline), and the corresponding ethyl, n-propyl, isopropyl and butyl esters.

As noted above, the compounds of the present invention demonstrate the ability to reduce blood pressure and to effect a dilation of the coronary vessels. They can accordingly be used where either or both of these effects are desired. Thus upon parenteral, oral or sublingual adminstration, the compounds produce a distinct and long lasting dilation of the coronary vessels which is intensified by a simultaneous nitrite-like effect of reducing the load on the heart. The effect on heart metabolism is thus one of energy saving. In addition, the compounds lower the blood pressure of normotonic and hypertonic animals and can thus be used as antihypertensive agents. These properties can be conveniently observed in well known laboratory models. Thus the coronary vessel dilation effect can be observed by measuring the increase in oxygen saturation in the coronary sinus in the narcotized, heart catheterized dog. In this model for example, 1-(3-nitrophenyl)-3-methyl-10-oxo-6,7,7a,8,9,10-hexahydro-1H,5H-benzo[i,j]quinolizine-2-carboxylic acid ethyl ester demonstrates a distinct effect upon the change in percent in oxygen saturation at a IV dose as low as 3 mg/kg.

The hypotensive activity of the present compounds can be observed by measuring the blood pressure of hypertensive rats following administration of the compounds. In this model, 1-(2-methylphenyl)-3-methyl-10-oxo-6,7,7a,9,9,10-hexahydro-1H,5H-benzo[i,j]quinolizine-2-carboxylic acid ethyl ester and 1-(3-nitro-6-chlorophenyl)-3-methyl-6,7,7a,8,9,10-hexahydro-1H,5H-benzo[i,j]quinolizine-2-carboxylic acid methyl ester effect at least a 15 mm reduction in blood pressure following oral doses of 31.5 and 3.1 mg/kg of body weight, respectively. The toxicity of the compounds is also favorably low.

In addition to the effect on blood pressure and coronary vessels, the compounds also lower the excitability of the stimulus formation and excitation conduction system within the heart so that an antifibrillation action is observed at therapeutic doses. The tone of the smooth muscle of the vessels is also greatly reduced. This vascular-spasmolytic action can be observed in the entire vascular system as well as in more or less isolated and circumscribed vascular regions such as the central nervous system. In addition, a strong muscular-spasmolytic action is manifested in the smooth muscle of the stomach, the intestinal tract, the urogenital tract and the respiratory system. Finally, there is some evidence that the compounds influence the cholesterol level and lipid level of the blood. These effects complement one another and the compounds are thus highly desirable as pharmaceutical agents to be used in the treatment of hypertension and conditions characterized by a constriction of the coronary blood vessels.

Pharmaceutical compositions for effecting such treatment will contain a major or minor amount, e.g. from 95 to 0.5percent, of at least one benzoquinolizine as herein defined in combination with a pharmaceutical carrier, the carrier comprising one or more solid, semisolid or liquid diluent, filler and formulation adjuvant which is nontoxic, inert and pharmaceutically acceptable. Such pharmaceutical compositions are preferably in dosage unit form; i.e. physically discrete units containing a predetermined amount of the drug corresponding to a fraction or multiple of the dose which is calculated to produce the desired therapeutic response. The dosage units can contain one, two, three four or more single doses or, alternatively, one-half, third or fourth of a single dose. A single dose preferably contains an amount sufficient to produce the desired therapeutic effect upon administration at one application of one or more dosage units according to a predetermined dosage regimen, usually a whole, half, third or quarter of the daily dosage administered once, twice, three of four times a day. Other therapeutic agents can also be present.

Although the dosage and dosage regimen must in each case be carefully adjusted, utilizing sound professional judgement and considering the age, weight and condition of the recipient, the route of administration and the nature and gravity of the illness, generally the daily dose will be from about 0.1 to about 10 mg/kg, preferably 0.5 to 5 mg/kg, when administered parenterally and from about 1 to about 100 mg/kg, preferably 5 to 50 mg/kg, when administered orally. In some instances a sufficient therapeutic effect can be obtained at lower doses while in others, larger doses will be required.

Oral administration can be effected utilizing solid and liquid dosage unit forms such as powders, tablets, dragees, capsules, granulates, suspensions, solutions and the like.

Powders are prepared by comminuting the compound to a suitable fine size and mixing with a similarly comminuted pharmaceutical carrier such as an edible carbohydrate as for example starch, lactose, sucrose, glucose or mannitol. Sweetening, flavoring, preservative, dispersing and coloring agents can also be present.

Capsules are made by preparing a powder mixture as described above and filling formed gelatin sheaths. Glidants and lubricants such as colloidal silica, talc, magnesium stearate, calcium stearate or solid polyethylene glycol can be added to the powder mixture before the filling operation. A disintegrating or solubilizing agent such as agar-agar, calcium carbonate or sodium carbonate can also be added to improve the availability of the medicament when the capsule is ingested.

Tablets are formulated for example by preparing a powder mixture, granulating or slugging, adding a lubricant and disintegrant and pressing into tablets. A powder mixture is prepared by mixing the compound, suitably comminuted, with a diluent or base as described above, and optionally with a binder such as carboxymethyl cellulose, an alginate, gelatin, or polyvinyl pyrrolidone, a solution retardant such as paraffin, a resorption accelerator such as a quaternary salt and/or an absorption agent such as bentonite, kaolin or dicalcium phosphate. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The midicaments can also be combined with free flowing inert carriers and compressed into tablets directly without going through the granulating or slugging steps. A clear or opaque protective coating consisting of a sealing coat of shellac, a coating of sugar or polymeric material and a polish coating of wax can be provided. Dyestuffs can be added to these Oral fluids such as solutions, syrups and elixirs can be prepared in dosage unit form so that a given quantity contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the compound in a nontoxic vehicle. Solubilizers and emulsifiers such as ethoxylated isostearyl alcohols and polyoxyethylene sorbitol esters, preservatives, flavor additives such as peppermint oil or saccharin, and the like can also be added.

Where appropriate, dosage unit formulations for oral administration can be microencapsulated. The formulation can also be prepared to prolong or sustain the release as for example by coating or embedding paarticulate material in polymers, wax or the like.

Parenteral administration can be effected utilizing liquid dosage unit forms such as sterile solutions and suspensions intended for subcutaneous, intramuscular or intravenous injection. These are prepared by suspending or dissolving a measured amount of the compound in a nontoxic liquid vehicle suitable for injection such as an aqueous or oleaginous medium and sterilizing the suspension or solution. Alternatively a measured amount of the compound is placed in a vial and the vial and its contents are sterilized and sealed. An accompanying vial or vehicle can be provided ro mixing prior to administration. Nontoxic salts and salt solutions can be added to render the injection isotonic. Stabilizers, preservatives and emulsifiers can also be added.

The following examples will serve to further typify the nature of the present invention through the presentation of specific embodiments. These examples should not be construed as a limitation on the scope of the invention since the subject matter regarded as the invention is set forth in the appended claims.

EXAMPLE 1

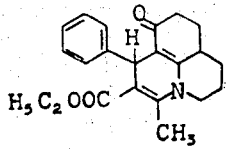

Upon boiling a solution of 21.8 g of benzylideneacetoacetic acid ethyl ester and 15.1 g of $\Delta^{8,9}$-octahydro-7-quinolone (which can be alternatively named as 7-oxo-1,2,3,4,4a,5,6,7-octahydroquinoline) in 150 ml of glacial acetic acid for 8 hours, 1-phenyl-3-methyl-10-oxo-6,7,7a,8,9,10-hexahydro-1H,5H-benzo[i,j]quinolizine-2-carboxylic acid ethyl ester of melting point 122° (ethyl acetate/petroleum ether) is obtained.
Yield: 59% of theory.

EXAMPLE 2

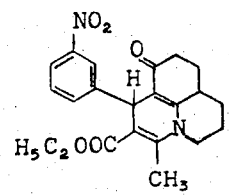

Upon heating a solution of 13.2 g of 3-nitrobenzylideneacetoacetic acid ethyl ester and 7.6 g of $\Delta^{8,9}$-octohydro-7-quinolone in 100 ml of glacial acetic acid for 10 hours, 1-(3-nitrophenyl)-3-methyl-10-oxo-6,7,7a,8,9,10-hexahydro-1H,5H-benzo[i,j]quinolizine-2-carboxylic acid ethyl ester of melting point 131° (ethyl acetate/petroleum ether) is obtained.
Yield: 66% of theory.

EXAMPLE 3

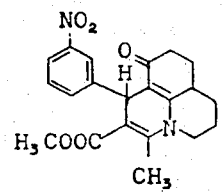

Upon boiling a solution of 7.6 g of 3-nitrobenzaldehyde, 5.8 g of acetoacetic acid methyl ester and 7.6 g of $\Delta^{8,9}$-octahydro-7-quinolone in 150 ml of glacial acetic acid for 8 hours, 1-(3-nitrophenyl)-3-methyl-10-oxo-6,7,7a,8,9,10-hexahydro-1H,5H-benzo[i,j]quinolizine-2-carboxylic acid methyl ester of melting point 138° (ethanol) is obtained.
Yield: 48% of theory.

EXAMPLE 4

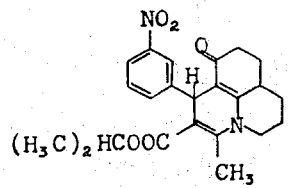

Upon boiling a solution of 5.6 g of 3-nitrobenzylideneacetoacetic acid isopropyl ester and 3.0 g of $\Delta^{8,9}$-octahydro-7-quinolone in 150 ml of glacial acetic acid for 8 hours, 1-(3-nitrophenyl)-3-methyl-10-oxo-6,7,7a,8,9,10-hexahydro-1H,5H-benzo[i,j]quinolizine-2-carboxylic acid isopropyl ester of melting point 135° (isopropanol) is obtained.
Yield: 81% of theory.

EXAMPLE 5

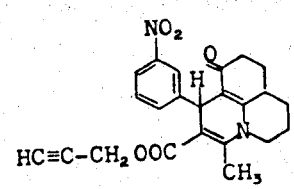

Upon heating a solution of 5.5 g of 3-nitrobenzylideneacetoacetic acid propargyl ester and 3.0 g of Δ⁸,⁹-octahydro-7-quinolone in 50 ml of glacial acetic acid for 12 hours, 1-(3-nitrophenyl)-3-methyl-10-oxo-6,7,7a,8,9,10-hexahydro-1H,5H-benzo[i,j]quinolizine-2-carboxylic acid propargyl ester of melting point 143°C (isopropanol) is obtained. Yield: 84% of theory.

EXAMPLE 6

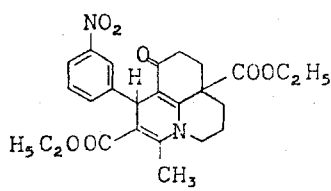

Upon boiling a solution of 26.3 g of 3-nitrobenzylideneacetoacetic acid ethyl ester and 22.3 g of Δ⁸,⁹-octahydro-7-quinolone-4a-carboxylic acid ethyl ester (which can be alternatively named as 4a-carbethoxy-7-oxo-1,2,3,4,4a,5,6,7-octahydroquinoline) in 250 ml of glacial acetic acid for 8 hours, 1-(3-nitrophenyl)-3-methyl-10-oxo-6,7,7a,8,9,10-hexahydro-1H,5H-benzo[i,j]quinolizine-2,7a-dicarboxylic acid diethyl ester of melting point 114°C (isopropanol) is obtained. Yield: 62% of theory.

EXAMPLE 7

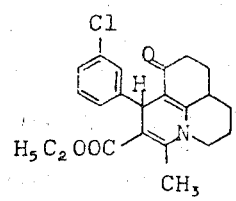

Upon boiling a solution of 11.6 g of 2-methylbenzylideneacetoacetic acid ethyl ester and 7.6 g of Δ⁸,⁹-octahydro-7-quinolone in 150 ml of glacial acetic acid for 8 hours, 1-(2-methylphenyl)-3-methyl-10-oxo-6,7,7a,8,9,10-hexahydro-1H,5H-benzo[i,j]quinolizine-2-carboxylic acid ethyl ester of melting point 80°C (ethyl acetate/petroleum ether) is obtained. Yield: 57% of theory.

EXAMPLE 8

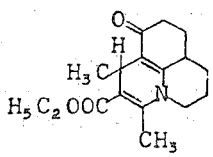

Boiling a solution of 15.6 g of ethylideneacetoacetic acid ethyl ester and 15.1 g of Δ⁸,⁹-octahydro-7-quinolone in 200 ml of ethanol for 8 hours yields 1,3-dimethyl-10-oxo-6,7,7a,8,9,10-hexahydro-1H,5H-benzol[i,j]quinolizine-2-carboxylic acid ethyl ester of melting point 78°C (ethyl acetate/petroleum ether). Yield: 62% of theory.

EXAMPLE 9

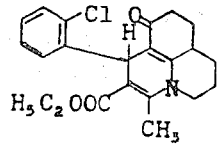

Upon boiling a solution of 12.6 g of 2-chlorobenzylideneacetoacetic acid ethyl ester and 7.6 g of Δ⁸,⁹-octohydro-7-quinolone in 120 ml of glacial acetic acid for 8 hours, 1-(2-chlorophenyl)-3-methyl-10-oxo-6,7,7a,8,9,10-hexahydro-1H,5H-benzo[i,j]quinolizine-2-carboxylic acid ethyl ester of melting point 168°C (ethanol) is obtained. Yield: 66% of theory.

EXAMPLE 10

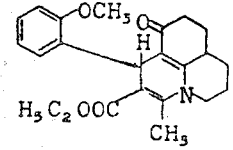

Upon heating a solution of 12.6 g of 3-chlorobenzylideneacetoacetic acid ethyl ester and 7.6 g of Δ⁸,⁹-octahydro-7-quinolone in 150 ml of glacial acetic acid for 10 hours, 1-(3-chlorophenyl)-3-methyl-10-oxo-6,7,7a,8,9,10-hexahydro-1H,5H-benzo[i,j]quinolizine-2-carboxylic acid ethyl ester of melting point 125°C is obtained (ethanol). Yield: 58% of theory.

EXAMPLE 11

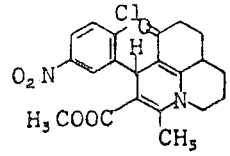

Upon boiling a solution of 12.4 g of 2-methoxybenzylideneacetoacetic acid ethyl ester and 7.6 g of Δ⁸,⁹-octahydro-7-quinolone in 150 ml of glacial acetic acid for 8 hours, 1-(2-methoxyphenyl)-3-methyl-10-oxo-6,7,7a,8,9,-hexahydro-1H,5H-benzo[i,j]quinolizine-2-carboxylic acid methyl ester is obtained. Melting point 164°C, yield 72% of theory.

EXAMPLE 12

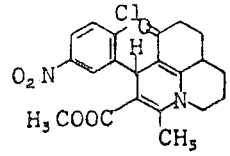

Heating a solution of 14.3 g of 3-nitro-6-chlorobenzylideneacetoacetic acid methyl ester and 7.6 g of Δ$^{8,9}$-hexahydro-7-quinolone in 150 ml of glacial acetic acid for 12 hours yields 1-(3-nitro-6-chlorophenyl)-3-methyl-10-oxo-6,7,7a, 8,9,10-hexahydro-1H,5H-benzo[i,j]quinolizine-2-carboxylic acid methyl ester of melting point 180°C (ethanol). Yield: 58% of theory.

EXAMPLE 13

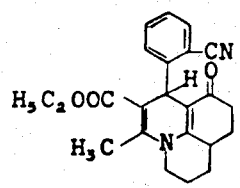

Upon heating a solution of 12.2 g of 2-cyanobenzylideneacetoacetic acid ethyl ester and 7.6 g of Δ$^{8,9}$-octahydro-7-quinolone in 100 ml of glacial acetic acid for 10 hours, 1-(2-cyanophenyl)-3-methyl-10-oxo-6,7,7a,8,9,10-hexahydro-1H,5H-benzo[i,j]quinolizine-2-carboxylic acid ethyl ester of melting point 157°C (ethyl acetate/petroleum ether) is obtained.
Yield: 48% of theory.

EXAMPLE 14

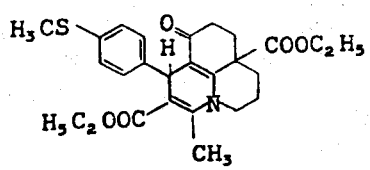

Upon boiling a solution of 26.5 g of 4-methylmercaptobenzylideneacetoacetic acid ethyl ester and 22.3 g of Δ$^{8,9}$-octahydro-7-quinolone-4a-carboxylic acid ethyl ester in 250 ml of glacial acetic acid for 8 hours, 1-(4-methylmercaptophenyl)-3-methyl-10-oxo-6,7,7a,8,9,10-hexahydro-1H,5H-benzo[i,j]-quinolizine-2,7a-dicarboxylic acid diethyl ester of melting point 113°C (ethyl acetate/petroleum ether) is obtained.
Yield: 52% of theory.

EXAMPLE 15

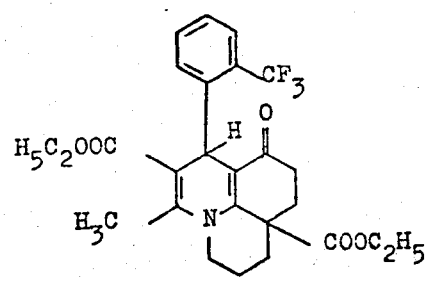

Upon boiling a solution of 28.6 g of 2-trifluoromethylbenzylideneacetoacetic acid ethyl ester and 22.3 g of Δ$^{8,9}$-octahydro-7-quinolone-4a-carboxylic acid ethyl ester in 250 ml of glacial acetic acid for 8 hours, 1-(2-trifluoromethylphenyl)-3-methyl-10-oxo-6,7,7a,8,9,10-hexahydro-1H,5H-benzo[i,j]quinolizine-2-7a-dicarboxylic acid diethyl ester of melting point 221°C (isopropanol) is obtained.
Yield: 56% of theory.

What is claimed is:

1. A compound of the formula:

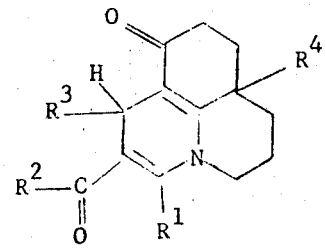

wherein
$R^1$ is hydrogen or lower alkyl;
$R^2$ is lower alkyl, lower alkoxy, lower alkoxy(lower alkoxy), lower alkenyloxy or lower alkynyloxy;
$R^3$ is lower alkyl, lower alkenyl, lower alkynyl; phenyl; substituted phenyl in which the substituents are one to three members selected from the group consisting of 1-3 lower alkyl, 1-3 lower alkoxy, 1-3 halogeno, 1-2 nitro, 1 cyano, 1-3 trifluoromethyl, 1 azido, 1-3 carbo(lower alkoxy),1 lower alkylsulfonyl, 1 lower alkylsulfinyl, and 1 lower alkylthio; napthyl; or a heterocyclic ring selected from the group consisting of quinolyl, isoquinolyl, pyridyl, and pyrryl, said heterocyclic ring being unsubstituted or substituted by one or two members selected from the group consisting of non-tertiary lower alkyl, lower alkoxy and halogeno; and
$R^4$ is hydrogen or carbo(lower alkoxy).

2. A compound according to claim 1 wherein $R^1$ is lower alkyl.

3. A compound according to claim 1 wherein $R^3$ is a heterocyclic ring selected from the group consisting of quinolyl, isoquinolyl, pyridyl, and pyrryl, said heterocyclic ring being unsubstituted or substituted by one or two members selected from the group consisting of non-tertiary lower alkyl, lower alkoxy and halogeno.

4. A compound according to claim 2 wherein $R^3$ is lower alkyl, naphthyl, phenyl or phenyl substituted with from one to three substituents selected from the group consisting of non-tertiary lower alkyl, 1-3 lower alkoxy, 1-3 halogeno, 1-2 nitro, 1 cyano, 1-3 trifluoromethyl, 1 azido, 1-3 carbo(lower alkoxy), 1 lower alkylsulfonyl, 1 lower alkylsulfinyl and lower 1 alkylthio.

5. The compound according to claim 1 which is 1-phenyl-3-methyl-10-oxo-6,7,7a,8,9,10-hexahydro-1H,5H-benzo-[i,j]quinolizine-2-carboxylic acid ethyl ester.

6. The compound according to claim 1 which is 1-(3-nitrophenyl)-3-methyl-10-oxo-6,7,7a,8,9,10-hexahydro-1H,5H-benzo[i,j]quinolizine-2-carboxylic acid ethyl ester.

7. The compound according to claim 1 which is 1-(3-nitrophenyl)-3-methyl-10-oxo-6,7,7a,8,9,10- hexahydro-1H,5H-benzo[i,j]quinolizine-2-carboxylic acid methyl ester.

8. The compound according to claim 1 which is 1-(3-nitrophenyl)-3-methyl-10-oxo-6,7,7a,8,9,10-hexahydro-1H,5H-benzo[i,j]quinolizine-2-carboxylic acid isopropyl ester.

9. The compound according to claim 1 which is 1-(3-nitrophenyl)-3-methyl-10-oxo-6,7,7a,8,9,10-hexahydro-1H,5H-benzo[i,j]quinolizine-2-carboxylic acid propargyl ester.

10. The compound according to claim 1 which is 1-(3-nitrophenyl)-3-methyl-10-oxo-6,7,7a,8,9,10-hexahydro-1H,5H-benzo[1,j]quinolizine-2,7a-dicarboxylic acid diethyl ester.

11. The compound according to claim 1 which is 1-(2-methylphenyl)-3-methyl-10-oxo-6,7,7a,8,9,10-hexahydro-1H,5H-benzo[i,j]quinolizine-2-carboxylic acid ethyl ester.

12. The compound according to claim 1 which is 1,3-dimethyl-10-oxo-6,7,7a,8,9,10-hexahydro-1H,5H-benzo[i,j]-quinolizine-2-carboxylic acid ethyl ester.

13. The compound according to claim 1 which is 1-(2-chlorophenyl)-3-methyl-10-oxo-6,7,7a,8,9,10-hexahydro-1H,5H-benzo[i,j]quinolizine-2-carboxylic acid ethyl ester.

14. The compound according to claim 1 which is 1-(3-chlorophenyl)-3-methyl-10-oxo-6,7,7a,8,9,10-hexahydro-1H,5H-benzoi,j]quinolizine-2-carboxylic acid ethyl ester.

15. The compound according to claim 1 which is 1-(2-methoxyphenyl)-3-methyl-10-oxo-6,7,7a,8,9,10-hexahydro-1H,5H-benzo[i,j]quinolizine-2-carboxylic acid methyl ester.

16. The compound according to claim 1 which is 1-(3-nitro-6-chlorophenyl)-3-methyl-10-oxo-6,7,7a,8,9,10-hexahydro-1H,5H-benzo[i,j]quinolizine-2-carboxylic acid methyl ester.

17. The compound according to claim 1 which is 1-(2-cyanophenyl)-3-methyl-10-oxo-6,7,7a,8,9,10-hexahydro-1H,5H-benzo[i,j]quinolizine-2-carboxylic acid ethyl ester.

18. The compound according to claim 1 which is 1-(4-methylmercaptophenyl)-3-methyl-10-oxo-6,7,7a,8,9,10-hexahydro-1H,5H-benzo[i,j]quinolizine-2,7a-dicarboxylic acid diethyl ester.

19. The compound according to claim 1 which is 1-(2-trifluoromethylphenyl)-3-methyl-10-oxo-6,7,7a,8,9,10-hexahydro-1H,5H-benzo[i,j]quinolizine-2,7a-dicarboxylic acid diethyl ester.

* * * * *

UNITED STATES PATENT AND TRADEMARK OFFICE
CERTIFICATE OF CORRECTION

PATENT NO. : 3,907,807
DATED : September 23, 1975
INVENTOR(S) : HORST MEYER ET AL It is certified that error appears in the above-identified patent and that said Letters Patent are hereby corrected as shown below:

The priority date should be corrected to read

-- March 6, 1972 --

Signed and Sealed this third Day of February 1976

[SEAL]

Attest:

RUTH C. MASON
*Attesting Officer*

C. MARSHALL DANN
*Commissioner of Patents and Trademarks*